United States Patent
Gainacopulos et al.

(10) Patent No.: US 10,960,530 B2
(45) Date of Patent: Mar. 30, 2021

(54) SYSTEM FOR COOLING A POWER TOOL

(71) Applicant: MILWAUKEE ELECTRIC TOOL CORPORATION, Brookfield, WI (US)

(72) Inventors: Nikos A. Gainacopulos, Milwaukee, WI (US); Michael R. Sande, Waukesha, WI (US); Michael A. Matthews, Milwaukee, WI (US); Derek J. Schwab, Milwaukee, WI (US); Steve Cunningham, Johnson Creek, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 41 days.

(21) Appl. No.: 16/080,586

(22) PCT Filed: Mar. 29, 2017

(86) PCT No.: PCT/US2017/024864
§ 371 (c)(1),
(2) Date: Aug. 28, 2018

(87) PCT Pub. No.: WO2017/173000
PCT Pub. Date: Oct. 5, 2017

(65) Prior Publication Data
US 2019/0291260 A1   Sep. 26, 2019

Related U.S. Application Data

(60) Provisional application No. 62/316,173, filed on Mar. 31, 2016.

(51) Int. Cl.
*H02K 9/06* (2006.01)
*H02K 11/33* (2016.01)
(Continued)

(52) U.S. Cl.
CPC ............ *B25F 5/008* (2013.01); *H02K 7/145* (2013.01); *H02K 9/06* (2013.01); *H02K 11/33* (2016.01)

(58) Field of Classification Search
CPC ............ H02K 9/06; H02K 7/14; H02K 7/145; H02K 11/33; B25F 5/008; H01L 2023/4056
(Continued)

(56) References Cited

U.S. PATENT DOCUMENTS

| 5,191,512 A | 3/1993 | Ogura et al. |
| 6,602,122 B1 | 8/2003 | Rudolf et al. |

(Continued)

FOREIGN PATENT DOCUMENTS

| EP | 2103396 A1 | 9/2009 |
| JP | 2006-340555 A | 12/2006 |

(Continued)

OTHER PUBLICATIONS

European Patent Office Extended Search Report for Application No. 17776605.2 dated Sep. 20, 2019 (8 pages).
(Continued)

Primary Examiner — Quyen P Leung
Assistant Examiner — Alexander Moraza
(74) Attorney, Agent, or Firm — Michael Best & Friedrich LLP

(57) ABSTRACT

System for cooling a power tool. One exemplary power tool includes a housing including an air intake and an air exhaust. The power tool further includes a motor and a fan configured to pull cooling air into the housing through the air intake, and exhaust the cooling air out of the housing through the air exhaust. The power tool further includes a plurality of field-effect transistors (FETs). The FETs couple the stator coils to a power source. The power tool further includes a FET board within the housing. The power tool further
(Continued)

includes a heat sink within the housing. The heat sink includes a first mounting portion and a second mounting portion. Each of the mounting portions includes a horizontal fin extending toward a respective side of the housing. A plurality of vertical fins extends from a top surface of each of the horizontal fins.

20 Claims, 11 Drawing Sheets

(51) Int. Cl.
*H02K 7/14* (2006.01)
*B25F 5/00* (2006.01)

(58) Field of Classification Search
USPC .......... 310/47, 50, 52, 62, 63, 64, 68 D; 165/80.3; 361/709, 710
See application file for complete search history.

(56) References Cited

U.S. PATENT DOCUMENTS

| | | | |
|---|---|---|---|
| 2003/0112602 A1* | 6/2003 | Lin | H01L 23/367 361/707 |
| 2007/0236177 A1* | 10/2007 | Phillips | H01M 2/0202 320/115 |
| 2013/0313925 A1 | 11/2013 | Mergener et al. | |
| 2016/0229045 A1* | 8/2016 | Hashimoto | B25D 17/043 |
| 2017/0239804 A1* | 8/2017 | Matsushita | H02K 11/33 |

FOREIGN PATENT DOCUMENTS

| | | |
|---|---|---|
| KR | 100717795 | 5/2007 |
| WO | 2015093057 | 6/2015 |

OTHER PUBLICATIONS

International Search Report and Written Opinion for Application No. PCT/US2017/024864 dated May 31, 2017, 17 pages.

* cited by examiner

SYSTEM FOR COOLING A POWER TOOL

RELATED APPLICATIONS

This application is a national phase filing under 35 U.S.C. 371 of International Application No. PCT/US2017/024864, filed on Mar. 29, 2017, which claims priority to U.S. Provisional Patent Application No. 62/316,173, filed on Mar. 31, 2016, the entire contents of which are hereby incorporated by reference.

FIELD OF THE INVENTION

The present invention relates to power tools.

BACKGROUND OF THE INVENTION

Power tools often include field-effect transistors (FETs) that generate heat during operation of the power tool.

SUMMARY

In one embodiment, a power tool is provided. The power tool includes a housing including an air intake and an air exhaust. The power tool further includes a motor within the housing. The motor includes a rotor and a stator. The rotor rotates about a motor axis and the stator includes stator coils that generate a magnetic field to drive the rotor. The power tool further includes a fan configured to pull cooling air into the housing through the air intake, and exhaust the cooling air out of the housing through the air exhaust. The power tool further includes a plurality of field-effect transistors (FETs) within the housing. The FETs couple the stator coils to a power source to allow the stator coils to generate the magnetic field. The power tool further includes a FET board within the housing. The FETs are mounted on the FET board. The power tool further includes a heat sink within the housing and secured to the FET board. The heat sink is in thermal contact with the FETs and includes a first mounting portion and a second mounting portion. At least one FET is mounted on each of the mounting portions, and each of the mounting portions includes a horizontal fin extending toward a respective side of the housing. The heat sink further includes a plurality of vertical fins extending from a top surface of each of the horizontal fins.

In another embodiment, a power tool is provided. The power tool includes a housing including an air intake and an air exhaust. The power tool further includes a motor within the housing. The motor includes a rotor and a stator. The rotor rotates about a motor axis and the stator includes stator coils that generate a magnetic field to drive the rotor. The power tool further includes a fan configured to pull cooling air into the housing through the air intake, and exhaust the cooling air out of the housing through the air exhaust. The power tool further includes a plurality of field-effect transistors (FETs) within the housing. The FETs couple the stator coils to a power source to allow the stator coils to generate the magnetic field. The power tool further includes a FET board within the housing. The FETs are mounted on the FET board. The power tool further includes a heat sink within the housing and secured to the FET board. The heat sink is in thermal contact with the FETs and includes a first mounting portion and a second mounting portion. At least one FET is mounted on each of the mounting portions. The heat sink further includes a connecting portion between the mounting portions configured to join the mounting portions. The FET board, the mounting portions, and the connecting portion form an air gap that allows the cooling air to flow in a direction defined by the motor axis from the air intake, through the air gap, and out of the air exhaust. The heat sink further includes a plurality of vertical fins extending from a top surface of the connecting portion In another embodiment, a power tool is provided. The power tool includes a housing including an air intake and an air exhaust. The power tool further includes a motor within the housing. The motor includes a rotor and a stator. The rotor is coupled to a motor shaft and the stator includes stator coils that generate a magnetic field to drive the rotor. The motor shaft extends in a front-rear direction and is coupled to a drive mechanism at a front of the power tool. The power tool further includes a fan configured to pull cooling air into the housing through the air intake, and exhaust the cooling air out of the housing through the air exhaust. The power tool further includes a plurality of field-effect transistors (FETs) within the housing. The FETs couple the stator coils to a power source to allow the stator coils to generate the magnetic field. The power tool further includes a FET board within the housing. The FETs are mounted on the FET board. The motor is located between the FET board and the drive mechanism in the front-rear direction. The power tool further includes a heat sink within the housing and secured to the FET board. The heat sink is in thermal contact with the FETs and includes a first mounting portion and a second mounting portion. At least one FET is mounted on each of the mounting portions. The heat sink further includes an air gap between the mounting portions. The FETs are mounted on an outer surface of the mounting portions such that the mounting portions and the air gap are located in between at least two of the FETs. The cooling air flows from the air intake, through the air gap, around and through the motor, and out of the air exhaust.

DETAILED DESCRIPTION OF THE DRAWINGS

Figure 1:
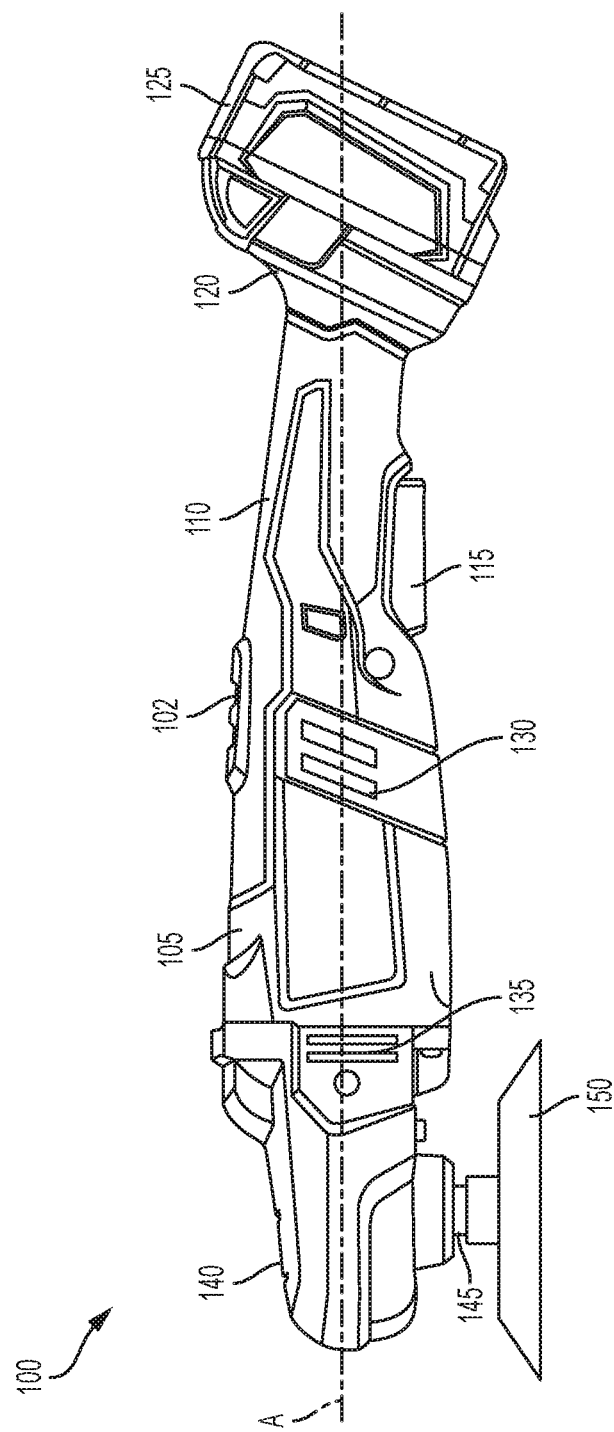
FIG. 1 illustrates a side view of a power tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

Additionally, a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a side view of a power tool 100. Although FIG. 1 illustrates the power tool 100 as a polisher, it should be understood that various embodiments described herein may be implemented on other types of power tools that are powered by brushless direct current motors such as grinders, sanders, reciprocating saws, circular saws, etc. In FIG. 1, the power tool 100 includes a housing 102 that includes a main body 105 and a handle portion 110 with a trigger 115. The housing 102 further includes a battery receptacle 120 that is coupled to the handle portion 110 opposite the main body 105. The battery receptacle 120 is configured to receive a battery pack 125 that provides power to the power tool 100. For example, in some embodiments, the battery pack 125 has a battery chemistry of Lithium-ion or Nickel-cadmium and a nominal voltage of approximately 18 Volts, 12 Volts, or 28 Volts. The battery pack 125 is supported by and removably mounted to the housing 102 of the power tool 100. The main body 105 of the power tool 100 includes an air intake 130 through which ambient air is pulled through to provide cooling air inside the housing 102. The power tool 100 further includes an air exhaust 135 through which the cooling air is exhausted from the inside of the housing 102 of the power tool 100. Although FIG. 1 shows only one side of the power tool 100, the opposite side of the housing 102 also includes an air intake 130 and an air exhaust 135 that are similar to those components as shown in FIG. 1. The housing 102 further includes a drive housing 140 that supports a spindle 145 that is coupled to a backing pad 150.

Figure 2:
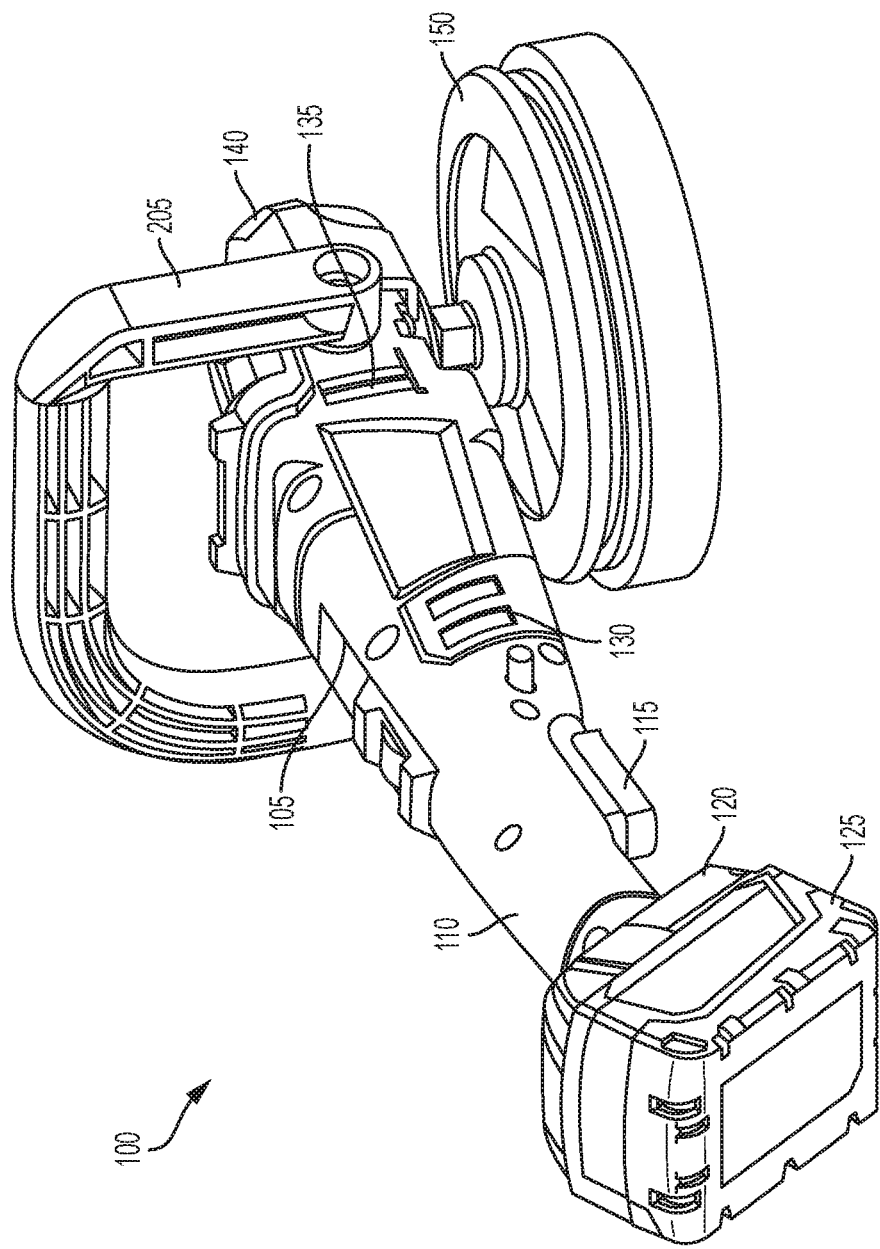
FIG. 2 illustrates a perspective view of the power tool of FIG. 1.

FIG. 2 illustrates a perspective view of the power tool 100 and shows similar components as those described with respect to FIG. 1. Additionally, FIG. 2 illustrates an optional secondary handle 205 coupled to the power tool 100 that may be present in some embodiments.

Figure 3A:
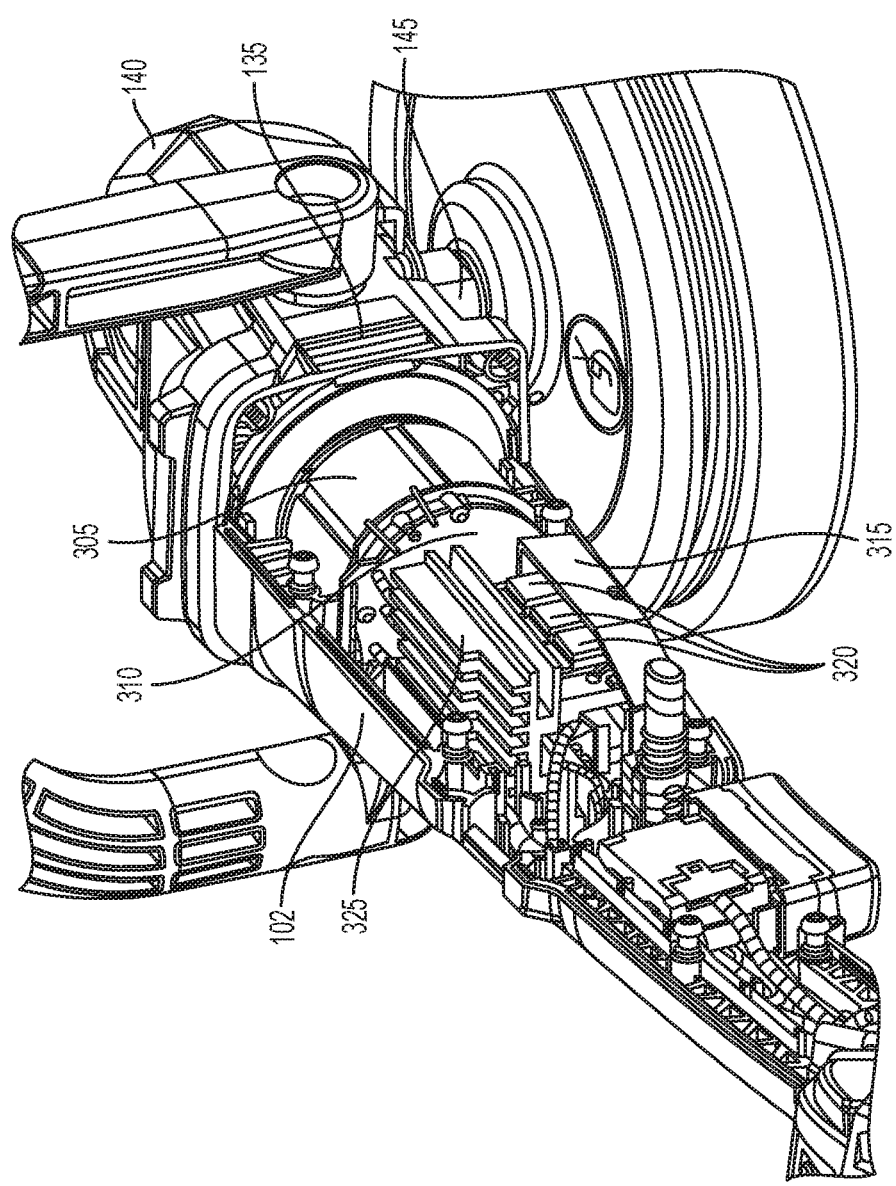
FIGS. 3A and 3B illustrate magnified perspective views of the power tool of FIG. 1 with a housing of the power tool partially removed.
Figure 3B:
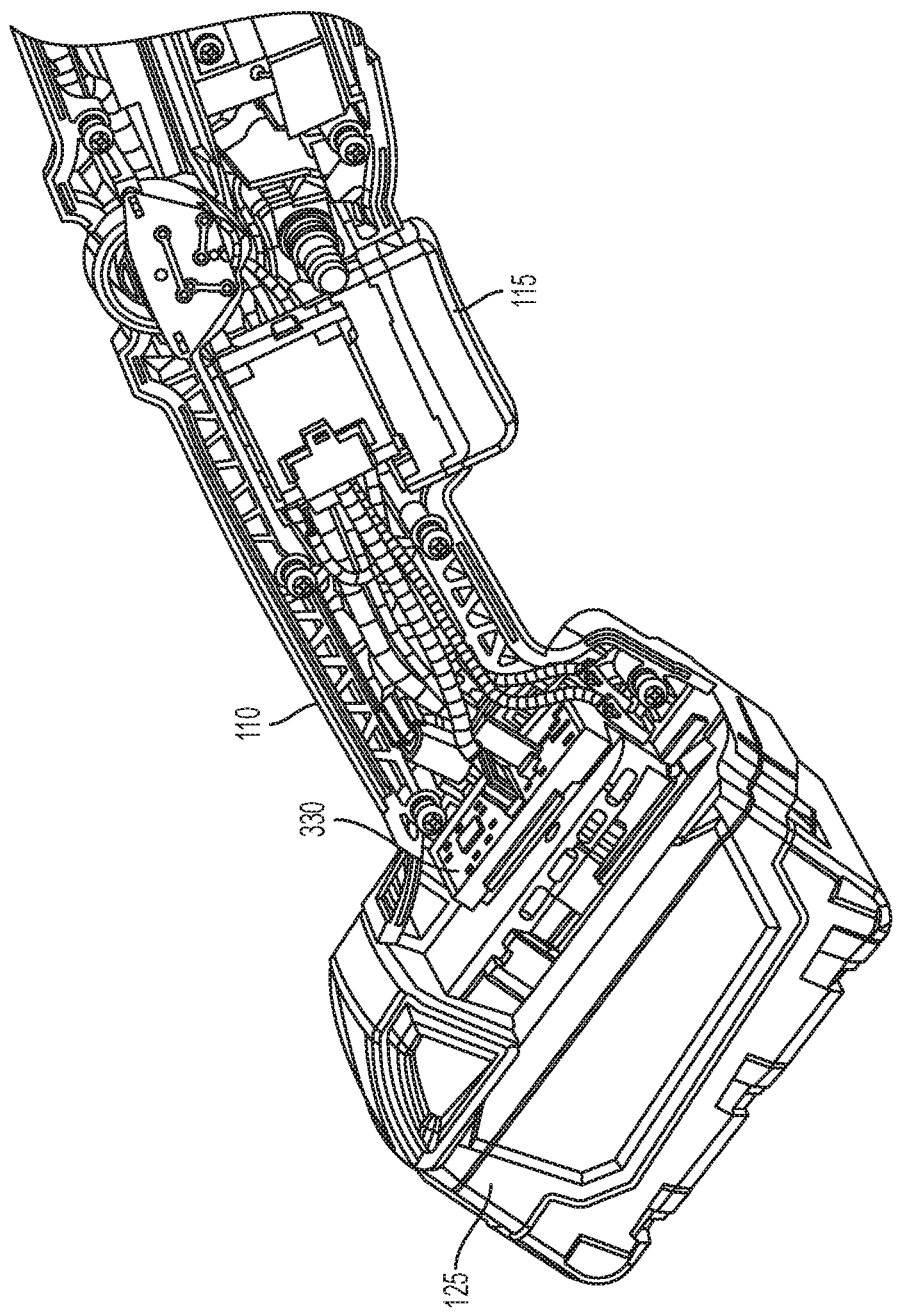

FIGS. 3A and 3B illustrate magnified perspective views of the power tool 100 with one side of the housing 102 removed. As shown in FIG. 3A, a motor 305 and a Hall sensor board 310 are provided inside the main body 105 of the power tool 100. In some embodiments, the motor 305 is a brushless direct current motor. The Hall sensor board 310 includes a motor facing surface on which Hall sensors 705 (FIG. 7) are mounted to monitor the position of a rotor of the motor 305. The motor 305 rotates about a motor axis A (FIG. 1). In some embodiments, the Hall sensor board 310 extends in a direction approximately perpendicular to a direction defined by the motor axis A. FIG. 3A further illustrates a potting boat 315 in which a field effect transistor (FET) board 505 (FIGS. 5A-C) is mounted. The FET board 505 includes FETs 320 that are electrically coupled to a control board 330 (FIG. 3B), to the motor 305, and to the battery pack 125. Although FIG. 3A shows three FETs 320 that are viewable on a first side of the power tool 100, the power tool 100 also includes three additional FETs 320 on the other (i.e., hidden) side of the power tool 100. In some embodiments, the FET board 505 extends in a direction approximately parallel to a direction defined by the motor axis and a top surface of the FET board 505 faces a direction approximately perpendicular to the direction defined by the motor axis A. The control board 330 includes an electronic processor 710 (FIG. 7) that selectively enables and disables the FETs 320 to sequentially couple stator coils of the motor 305 to the battery pack 125. The energized stator coils generate a magnetic field that drives a permanent magnet rotor of the motor 305. Using signals received from the Hall sensors 705 that are indicative of rotor position, the electronic processor 710 of the control board 330 controls energizing of the FETs 320 to operate the motor 305 at a desired speed. For example, as shown in FIG. 3B, the control board 330 is electrically coupled to the trigger 115 to receive a user input that indicates the desired motor speed.

Figure 4:
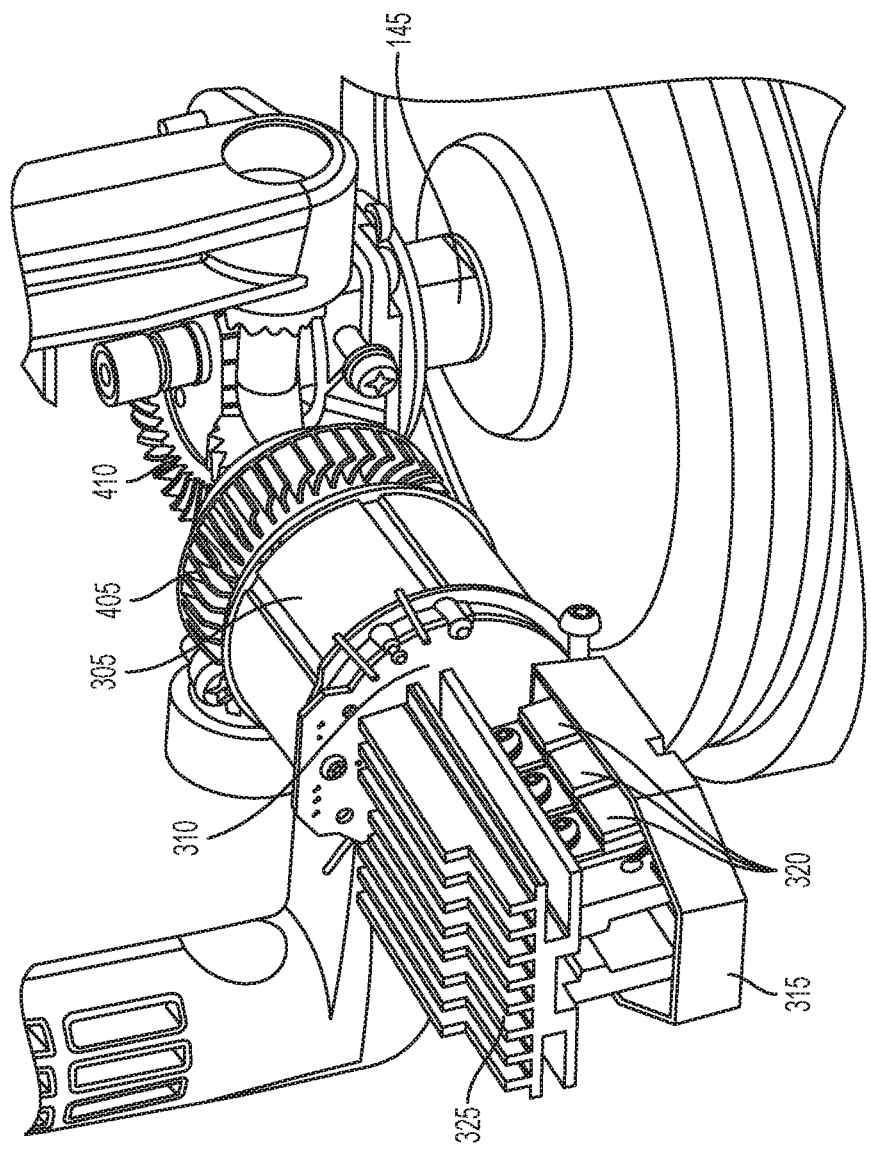
FIG. 4 shows a further magnified perspective view of the power tool of FIG. 1 with additional parts of the housing removed.

Referring to FIGS. 3A and 4, the motor 305 is coupled to a drive mechanism 410 that is located within the drive housing 140. The drive mechanism 410 includes a number of gears that convert rotational motion of a motor shaft along the motor axis A to rotational motion of the spindle 145 along a spindle axis. In turn, the spindle 145 is coupled to the backing pad 150 which is further coupled to a second pad (e.g., cutting pad, polishing pad, brush, etc.). The spindle 145 rotates the second pad against a surface to polish and/or buffer the surface. The motor shaft extends along the motor axis A in a front-rear direction.

During operation of the power tool 100, the FETs 320 may be controlled to be enabled and disabled using a pulse width modulation (PWM) control signal, for example. When the FETs 320 are enabled and disabled, they often generate heat. To help dissipate the heat generated by the FETs 320, the power tool 100 includes a heat sink 325 on which the FETs are mounted.

FIG. 4 shows a further magnified perspective view of the power tool 100 with additional parts of the housing 102 removed. As shown in FIG. 4, in addition to the components previously described with respect to FIGS. 3A and 3B, the power tool 100 also includes a fan 405 coupled to the motor shaft of the power tool 100. The fan 405 rotates when the power tool 100 operates to pull cooling air from the ambient environment into the housing 102 through the air intakes 130. The fan 405 further pulls the cooling air proximate the FETs 320 and through the fins of the heat sink 325, around and through the motor 305, and then exhausts the cooling air out of the housing 102 through the air exhausts 135. In some embodiments, the motor 305 is located between the FET board 505 and the fan 405 in the front-rear direction.

Figure 5A:
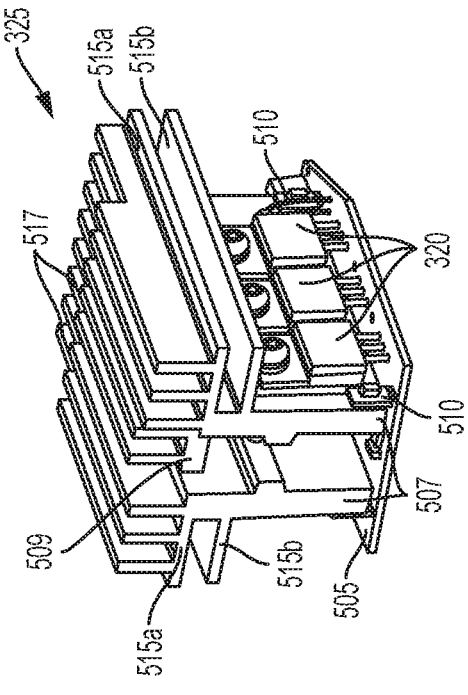
FIGS. 5A-C illustrate a heat sink and a field effect transistor (FET) board of the power tool of FIG. 1 according to some embodiments.
Figure 5B:
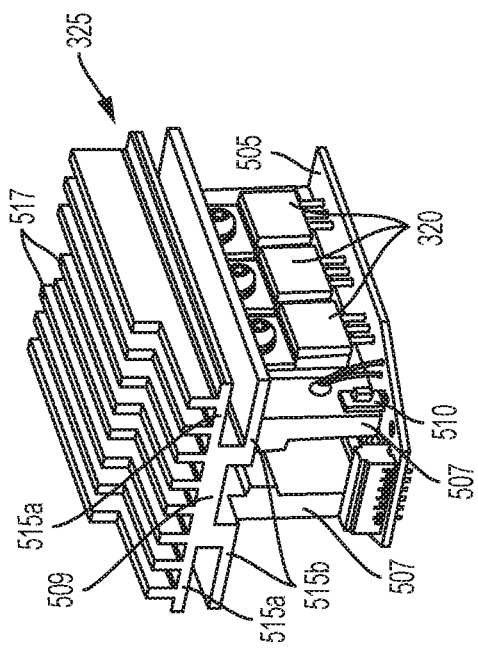
Figure 5C:
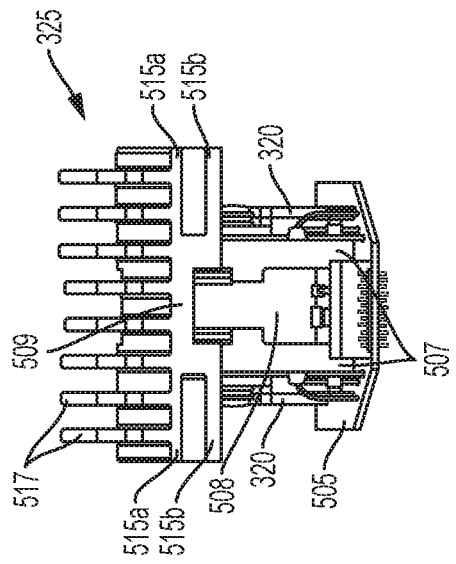

The heat sink 325 and the interior of the housing 102 provide for cooling of the FETs 320. More particularly, FIGS. 5A-C illustrate the heat sink 325 and a FET board 505 with the potting boat 315 removed. FIG. 5A shows a front perspective view of the heat sink 325 and the FET board 505 from a first side. FIG. 5B shows a rear perspective view of the heat sink 325 and the FET board 505 from a second side that is opposite the first side. FIG. 5C shows a front view of the heat sink 325 and the FET board 505. As shown in FIGS. 5A-C, in some embodiments, the FETs 320 are coupled to a top surface of the FET board 505 (e.g., the FETs 320 are soldered to the top surface of the FET board 505).

The heat sink 325 includes two mounting portions 507 (i.e., a first mounting portion and a second mounting portion). An air gap 508 is located between the mounting portions 507. Cooling air from the air intake 130 can flow in a direction defined by the motor axis A through the air gap 508, around and through the motor 305, and out of the air exhaust 135. The air gap 508 is formed by the FET board 505, the two mounting portions 507, and a connecting portion 509 of the heat sink 325. The connecting portion 509 is located between the mounting portions 507 and joins the mounting portions 507 together. The mounting portions 507 of the heat sink 325 are coupled to the FET board 505 using clips 510. In some embodiments, four clips 510 are used to secure the heat sink 325 to the FET board 505 (i.e., a clip 510 on each outer corner of each mounting portion 507 of the heat sink 325). The FETs 320 are mounted to the mounting portions 507 of the heat sink 325 using screws (i.e., such that the heat sink 325 is in thermal contact with the FETs 320). In some embodiments, the FETs 320 are mounted on an outer surface of each of the mounting portions 507 as shown in FIGS. 5A-C. In such embodiments, the mounting portions 507 and the air gap 508 are located in between the FETs 320 mounted on the respective outer surfaces of the mounting portions 507.

Additionally, the heat sink 325 includes a number of fins that protrude in various directions to provide additional surface area to dissipate heat from the FETs 320. For example, the each of the mounting portions 507 of the heat sink 325 includes horizontal fins 515a and 515b that extend toward a respective side of the housing 102. In some embodiments, the horizontal fins 515a and 515b extend perpendicularly to the respective mounting portions 507 and are approximately parallel to the top surface of the FET board 505. Each of the mounting portions 507 includes a top horizontal fin 515a and a bottom horizontal fin 515b. The heat sink 325 also includes vertical fins 517 that extend upward from a top surface of each of the top horizontal fins 515a and from a top surface of the connecting portion 509. In some embodiments, the vertical fins 517 extend perpendicularly from the top surface of each of the top horizontal fins 515a and from the top surface of the connecting portion 509 (i.e., in a direction perpendicular to the top surface of the FET board 505 and parallel to the mounting portions 507). In some embodiments, the mounting portions 507 extend upward in a direction approximately perpendicular to the top surface of the FET board 505 and approximately parallel to the vertical fins 517. The fins 515a, 515b, and 517 are configured to allow cooling air to flow from the air intakes 130 proximate the fins 515a, 515b, and 517, and out of the air exhausts 135. Thus, the heat sink 325 provides a large amount of surface area for heat to dissipate from the FETs 320 while still allowing cooling air to pass through the housing 102 from one end of the power tool 100 to the other end of the power tool 100.

Figure 6A:
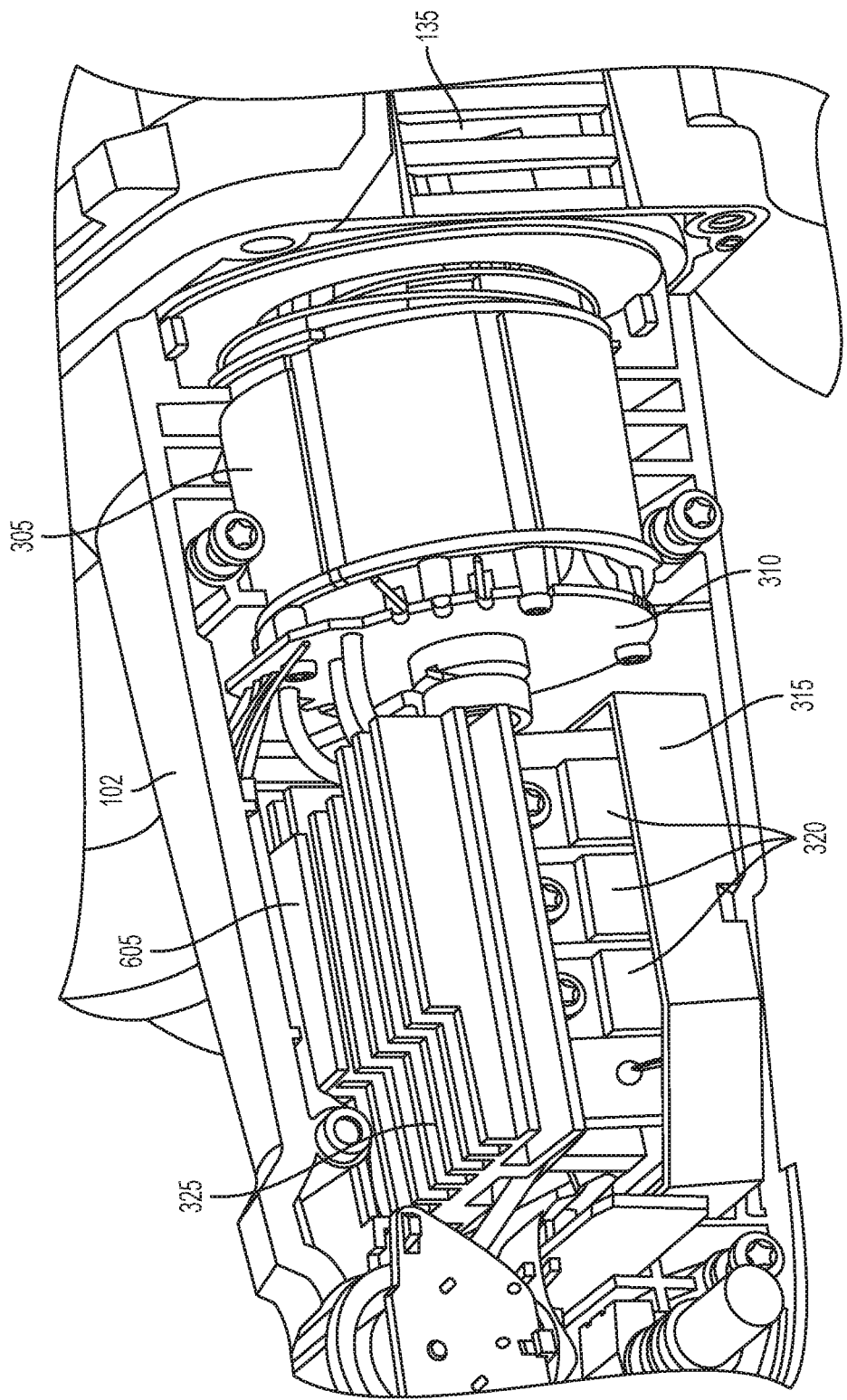
FIGS. 6A-D illustrate magnified views of a motor, the heat sink, and the FETs with the housing of the power tool partially removed.

Additionally, the interior of the housing 102 further provides for cooling of the FETs 320 by directing the cooling air across the fins 515 and proximate the FETs 320. FIGS. 6A-D illustrate magnified views of the motor 305, the heat sink 325, and the FETs 320 with part of the housing 102 removed. As shown in FIG. 6A, the interior of the housing 102 includes a wall 605 that is located above the heat sink 325 and is approximately parallel to the FET board 505. The wall 605 directs cooling air closer to the heat sink 325 (i.e., deeper within the fins 515) to allow for cooling of the FETs 320. FIG. 6A shows part of the housing 102 removed to allow for the interior of the power tool 100 to be viewable. Accordingly, only part of the wall 605 is shown in FIG. 6A. In some embodiments, the wall 605 may extend across the entire width of the heat sink 325 and may be a part of the interior of the housing 102 on each respective side of the power tool 100. Accordingly, in some embodiments, the wall 605 is made of the same material as the housing 102 (e.g., plastic).

Figure 6B:
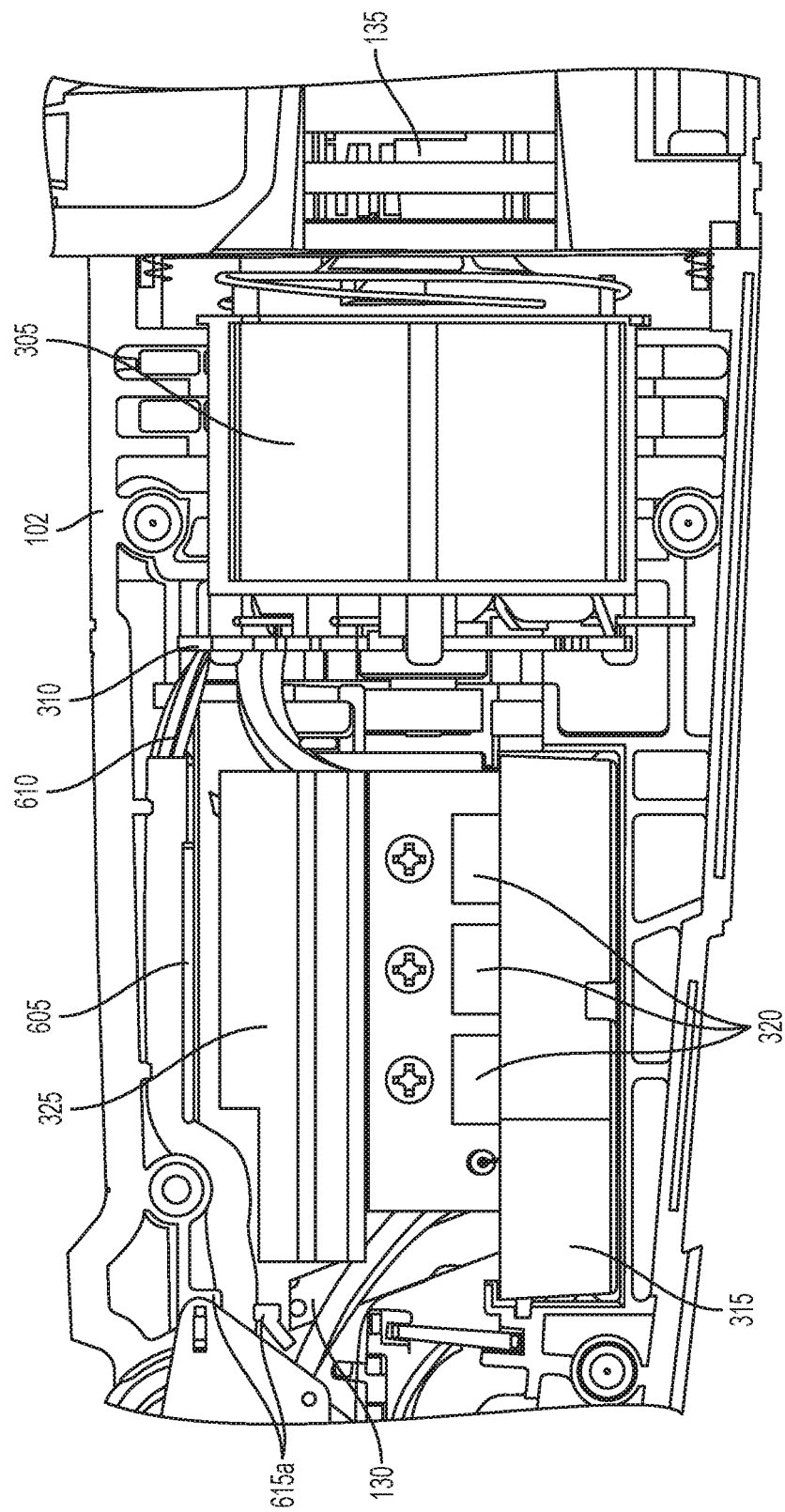

As shown in FIG. 6B, electrical wires 610 may be routed above the wall 605. In some embodiments, the electrical wires 610 electrically couple the Hall sensors 705 of the Hall sensor board 310 to the control board 330. Furthermore, as shown in FIG. 6B, the potting boat 315 and the heat sink 325 are placed within the housing 102 such that the cooling air from the air intakes 130 is directed to pass by the FETs 320 and through the fins 515 of the heat sink 325. FIG. 6B also shows the air intakes 130 positioned on the sides of the main body 105 of the housing 102 proximate an end of the heat sink 325 that is closest to the handle portion 110 of the power tool 100.

Figure 6C:
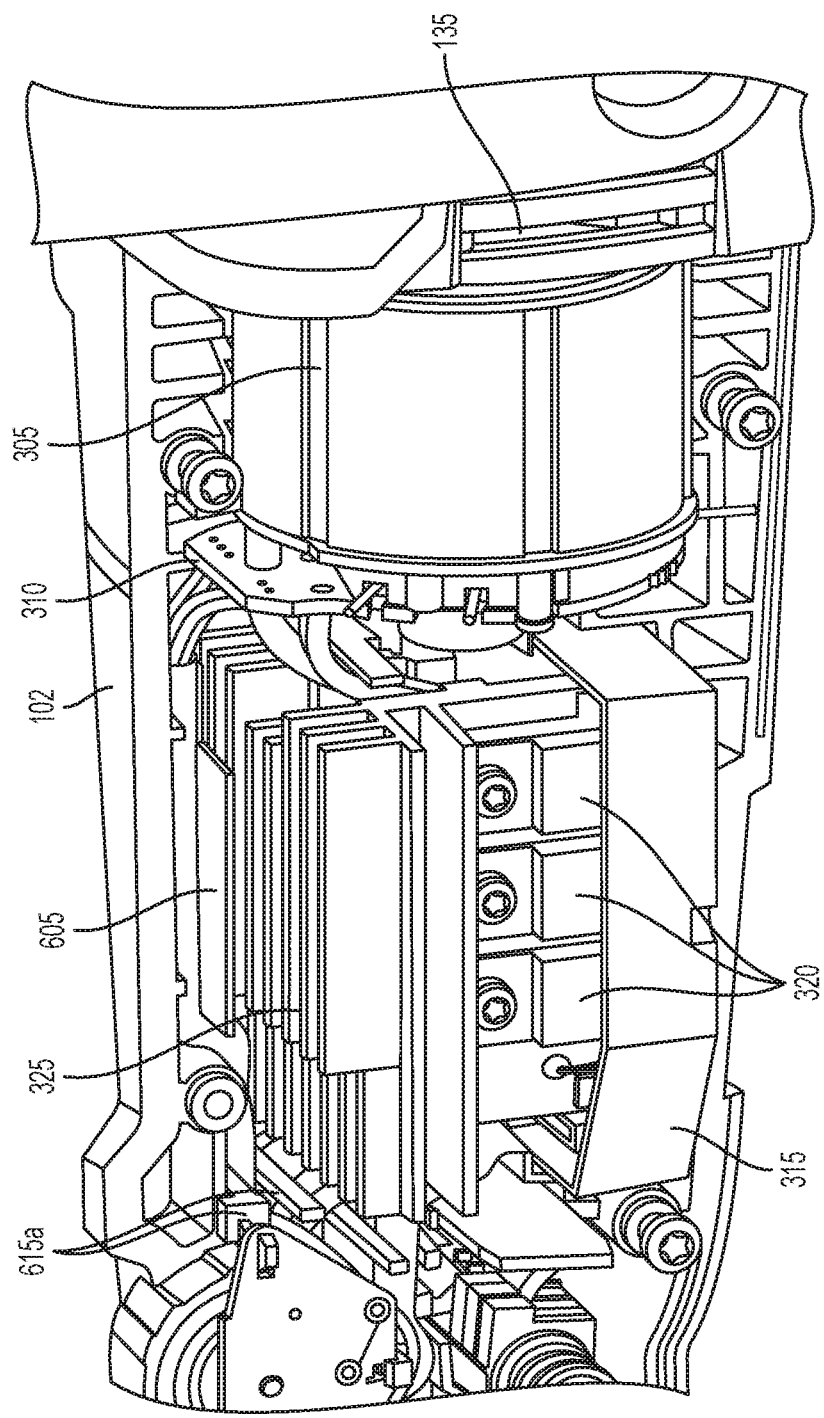
Figure 6D:
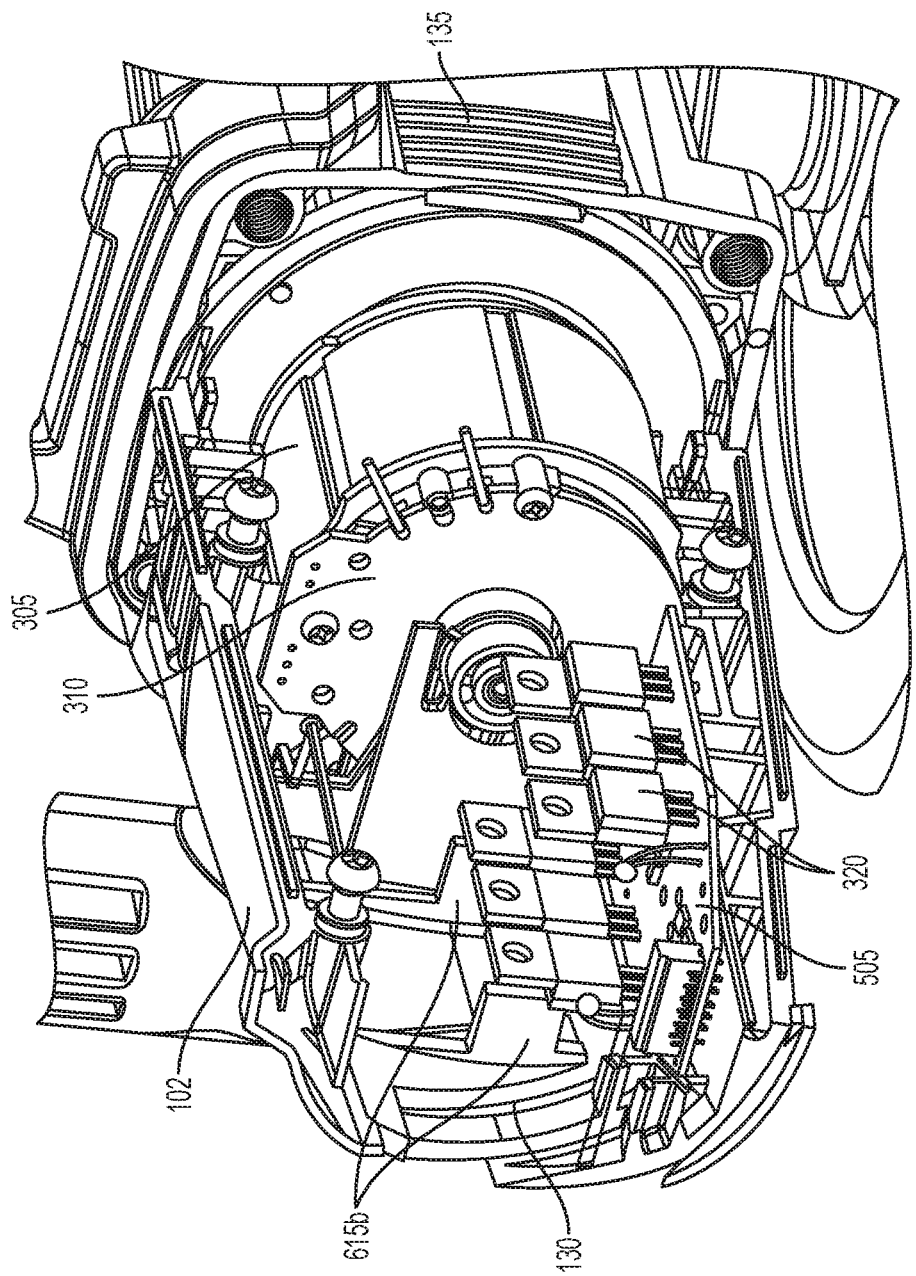

The interior of the housing 102 further includes baffling ribs 615 as illustrated in FIGS. 6C and 6D. As shown in FIG. 6C, the interior of the housing 102 includes baffling ribs 615a to further direct cooling air along the heat sink 325. Accordingly, the cooling air from the air intakes 130 is directed across the FETs 320 and through the fins 515 of the heat sink 325 to dissipate heat generated by the FETs 320. FIG. 6C shows part of the housing 102 removed to allow for the interior of the power tool 100 to be viewable. Accordingly, only part of the baffling ribs 615a are shown in FIG. 6C. In some embodiments, the baffling ribs 615a may extend across the entire width of the heat sink 325 from one side of the housing 102 to the other side of the housing 102.

FIG. 6D illustrates a perspective cut-away view of the power tool 100 with the heat sink 325 removed to allow baffling ribs 615b to be viewable. As shown in FIG. 6D, baffling ribs 615b are located on a side of the housing 102 proximate the air intake 130. The baffling ribs 615b direct cooling air from the air intakes 130 to flow proximate the fins 515 of the heat sink 325. The cooling air then flows around and/or through the motor 305 and out of the air exhausts 135. Corresponding baffling ribs 615b are positioned on the opposite interior side wall of the housing 102 proximate the air intakes 130 on the side of the housing 102 that is removed from FIG. 6D. In some embodiments, the baffling ribs 615b are approximately the same shape as each other.

Figure 7:
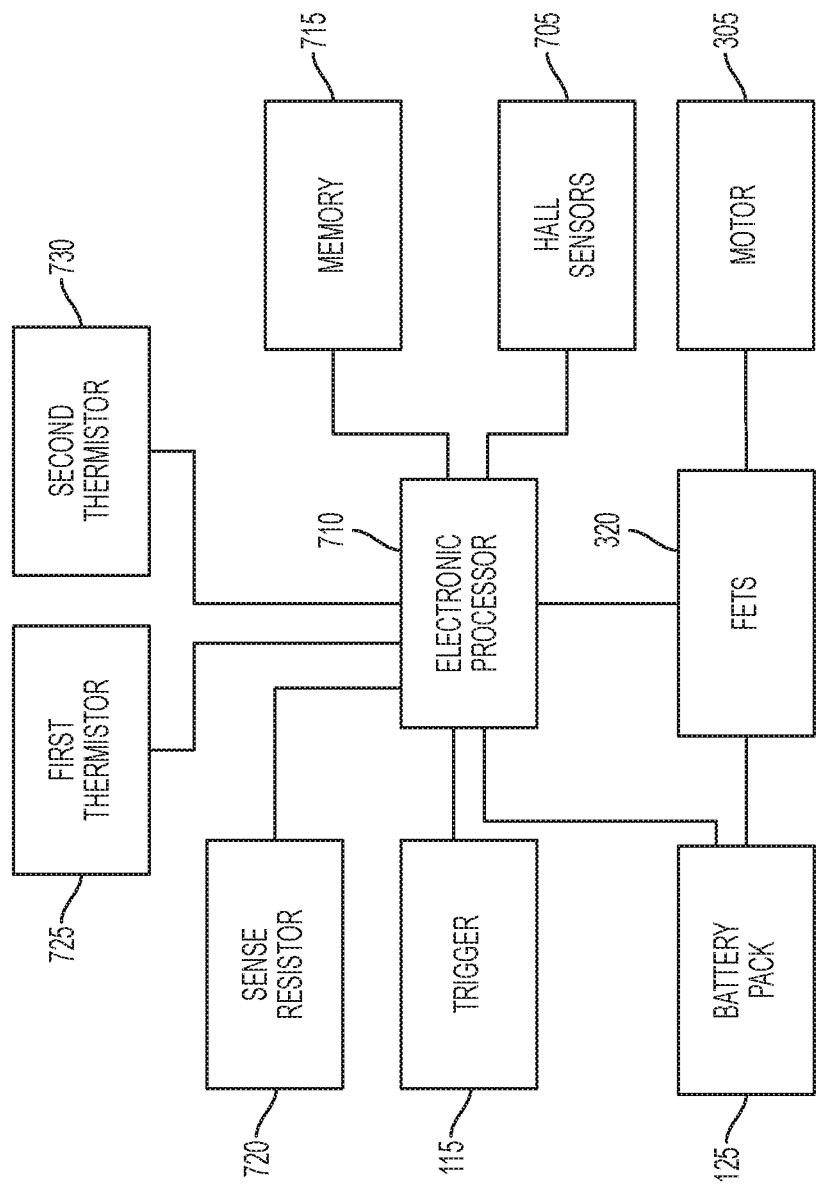
FIG. 7 illustrates a block diagram of the power tool 100 according to some embodiments.

FIG. 7 illustrates a block diagram of the power tool 100 in an exemplary embodiment. As shown in FIG. 7, in addition to the components explained above, the power tool 100 includes a memory 715, a sense resistor 720, a first thermistor 725, and a second thermistor 730. The electronic processor 710 is configured to receive instructions and data from the memory 715 and to execute, among other things, the instructions. For example, the electronic processor 710 may execute a predictive model to determine when an internal temperature inside the housing 102 is likely to rise above a predetermined temperature threshold (e.g., 125 degrees Celsius). In some embodiments, the electronic processor 710 monitors a current through the electronics of the power tool 100 (e.g., a current drawn by the motor 305) using the sense resistor 720. Furthermore, the electronic processor 710 determines the internal temperature inside the housing 102 by monitoring the first thermistor 725 and the second thermistor 730. In some embodiments, the thermistors 725, 730 may be located on each side of the heat sink 325 (e.g., located proximately to each set of three FETs 320). It should be understood that although FIG. 7 shows two thermistors 725, 730, in some embodiments, a single thermistor is used.

When executing the predictive model, the electronic processor 710 uses the higher of the two temperatures respectively determined from the thermistors 725, 730 and the monitored current from the sense resistor 720 to predict how the internal temperature inside the housing 102 is likely to be affected. When the electronic processor 710 determines that the internal temperature inside the housing 102 is likely to rise above the predetermined temperature threshold, the electronic processor 710 shuts down the power tool 100 (e.g., by disabling the FETs 320 to prevent the stator coils of the motor 305 from being coupled to the battery pack 125). Accordingly, using the predictive model, the electronic processor 710 shuts down the power tool 100 before the internal temperature reaches the predetermined temperature threshold. For example, the electronic processor 710 may shut down the power tool 100 when the monitored internal temperature is above approximately 115 degrees Celsius and the monitored current through the sense resistor 720 is high enough to indicate that the internal temperature is likely to increase above the predetermined temperature threshold (e.g., 125 degrees Celsius).

In some embodiments, the heat sink 325 is configured to continuously dissipate between approximately thirty Watts of heat and approximately ninety Watts of heat without the power tool 100 shutting down. In other embodiments, the heat sink 325 is configured to continuously dissipate between approximately fifty Watts of heat and approximately seventy Watts of heat without the power tool 100 shutting down. In further embodiments, the heat sink 325 is configured to continuously dissipate approximately sixty-six Watts of heat without the power tool 100 shutting down.

Thus, the invention provides, among other things, a heat sink and a power tool housing that allows for cooling air to flow past the heat sink and the FETs to dissipate heat generated by the FETs.

We claim:

1. A power tool comprising:
   a housing including an air intake and an air exhaust;
   a motor within the housing, the motor including a rotor and a stator, wherein the rotor rotates about a motor axis and the stator includes stator coils that generate a magnetic field to drive the rotor;
   a fan configured to
      pull cooling air into the housing through the air intake, and
      exhaust the cooling air out of the housing through the air exhaust;
   a plurality of field-effect transistors (FETs) within the housing, wherein the FETs couple the stator coils to a power source to allow the stator coils to generate the magnetic field;
   a FET board within the housing, wherein the FETs are mounted on the FET board; and
   a heat sink within the housing and secured to the FET board, the heat sink being in thermal contact with the FETs and including
      a first mounting portion and a second mounting portion, at least one FET being mounted on each of the mounting portions, and each of the mounting portions including a top horizontal fin extending toward a respective side of the housing, wherein the first mounting portion includes a first top horizontal fin that extends in a first direction and the second mounting portion includes a second top horizontal fin that extends in a second direction opposite from the first direction, and
      a plurality of vertical fins extending from a top surface of each of the top horizontal fins.

2. The power tool of claim 1, wherein each of the mounting portions includes a plurality of horizontal fins including the respective top horizontal fin and a bottom horizontal fin that extend toward a respective side of the housing.

3. The power tool of claim 1, wherein the heat sink includes an air gap between the mounting portions that allows the cooling air to flow in a direction defined by the motor axis from the air intake, through the air gap, and out of the air exhaust.

4. The power tool of claim 1, wherein the FET board extends in a direction approximately parallel to a direction defined by the motor axis and a top surface of the FET board faces a direction approximately perpendicular to the direction defined by the motor axis;
   wherein the mounting portions extend upward in a direction approximately perpendicular to the top surface of the FET board and approximately parallel to the plurality of vertical fins.

5. The power tool of claim 1, wherein the top horizontal fins extend perpendicularly to the respective mounting portions;
   wherein the plurality of vertical fins extend perpendicularly from the top surface of each of each of the top horizontal fins.

6. The power tool of claim 1, wherein the motor axis extends in a front-rear direction and a motor shaft extends along the motor axis and is coupled to a drive mechanism at a front of the power tool, and further comprising:
   a Hall sensor board including at least one Hall sensor, wherein the Hall sensor board extends in a direction approximately perpendicular to a direction defined by the motor axis;
   wherein the motor is located between the heat sink and the drive mechanism along the motor axis; and
   wherein the Hall sensor board is located between the motor and the heat sink along the motor axis such that the cooling air flows from the air intake, through and around the heat sink before flowing around the Hall sensor board and the motor, and out of the air exhaust.

7. The power tool of claim 1, wherein an interior of the housing includes a wall located above the heat sink and approximately parallel to the FET board, the wall configured to direct the cooling air through the plurality of vertical fins.

8. The power tool of claim 1, wherein an interior of the housing includes a plurality of baffling ribs proximate the air intake, the baffling ribs configured to direct the cooling air to flow proximate the heat sink.

9. A power tool comprising:
   a housing including an air intake and an air exhaust;
   a motor within the housing, the motor including a rotor and a stator, wherein the rotor is rotates about a motor axis and the stator includes stator coils that generate a magnetic field to drive the rotor;
   a fan configured to
      pull cooling air into the housing through the air intake, and
      exhaust the cooling air out of the housing through the air exhaust;

a plurality of field-effect transistors (FETs) within the housing, wherein the FETs couple the stator coils to a power source to allow the stator coils to generate the magnetic field;
a FET board within the housing, wherein the FETs are mounted on the FET board; and
a heat sink within the housing and secured to the FET board, the heat sink being in thermal contact with the FETs and including
a first mounting portion and a second mounting portion, at least one FET being mounted on each of the mounting portions,
a connecting portion between the mounting portions configured to join the mounting portions, wherein the FET board, the mounting portions, and the connecting portion form an enclosed air gap that allows the cooling air to flow in a direction defined by the motor axis from the air intake, through the air gap, and out of the air exhaust, wherein the air gap is enclosed on a first side by the FET board, on a second side by the connecting portion, and on a third side and a fourth side by a respective one of the mounting portions, and
a plurality of vertical fins extending from a top surface of the connecting portion.

10. The power tool of claim 9, wherein each of the mounting portions includes a plurality of horizontal fins including a top horizontal fin and a bottom horizontal fin that extend toward a respective side of the housing;
wherein the plurality of vertical fins extend from a top surface of each of the top horizontal fins.

11. The power tool of claim 10, wherein the plurality of horizontal fins extend perpendicularly to the respective mounting portions;
wherein the plurality of vertical fins extend perpendicularly from the top surface of each of each of the top horizontal fins and the connecting portion.

12. The power tool of claim 9, wherein the FET board extends in a direction approximately parallel to a direction defined by the motor axis and a top surface of the FET board faces a direction approximately perpendicular to the direction defined by the motor axis;
wherein the mounting portions extend upward in a direction approximately perpendicular to the top surface of the FET board and approximately parallel to the plurality of vertical fins.

13. The power tool of claim 9, wherein the motor axis extends in a front-rear direction and a motor shaft extends along the motor axis and is coupled to a drive mechanism at a front of the power tool, and further comprising:
a Hall sensor board including at least one Hall sensor, wherein the Hall sensor board extends in a direction approximately perpendicular to a direction defined by the motor axis;
wherein the motor is located between the heat sink and the drive mechanism along the motor axis; and
wherein the Hall sensor board is located between the motor and the heat sink along the motor axis such that the cooling air flows from the air intake, through and around the heat sink before flowing around the Hall sensor board and the motor, and out of the air exhaust.

14. The power tool of claim 9, wherein an interior of the housing includes a wall located above the heat sink and approximately parallel to the FET board, the wall configured to direct the cooling air through the plurality of vertical fins.

15. The power tool of claim 9, wherein an interior of the housing includes a plurality of baffling ribs proximate the air intake, the baffling ribs configured to direct the cooling air to flow proximate the heat sink.

16. A power tool comprising:
a housing including an air intake and an air exhaust;
a motor within the housing, the motor including a rotor and a stator, wherein the rotor is coupled to a motor shaft and the stator includes stator coils that generate a magnetic field to drive the rotor, the motor shaft extending along a motor axis in a front-rear direction and being coupled to a drive mechanism at a front of the power tool;
a fan configured to
pull cooling air into the housing through the air intake, and
exhaust the cooling air out of the housing through the air exhaust;
a plurality of field-effect transistors (FETs) within the housing, wherein the FETs couple the stator coils to a power source to allow the stator coils to generate the magnetic field;
a FET board within the housing, wherein the FETs are mounted on the FET board, the motor being located between the FET board and the drive mechanism in the front-rear direction; and
a heat sink within the housing and secured to the FET board, the heat sink being in thermal contact with the FETs and including
a first mounting portion and a second mounting portion, at least one FET being mounted on each of the mounting portions, and
an air gap between the mounting portions, wherein the FETs are mounted on an outer surface of the mounting portions such that the mounting portions and the air gap are located in between at least two of the FETs, and wherein the motor axis passes through the air gap;
wherein the cooling air flows from the air intake, through the air gap, around and through the motor, and out of the air exhaust.

17. The power tool of claim 16, wherein the FET board extends in a direction approximately parallel to the front-rear direction, and a top surface of the FET board faces a direction approximately perpendicular to the front-rear direction.

18. The power tool of claim 16, further comprising:
a Hall sensor board including at least one Hall sensor, wherein the Hall sensor board extends in a direction approximately perpendicular to a direction defined by the motor axis;
wherein the motor is located between the FET board and the fan along the motor axis; and
wherein the Hall sensor board is located between the motor and the heat sink along the motor axis such that the cooling air flows from the air intake, through and around the heat sink before flowing around the Hall sensor board and the motor, and out of the air exhaust.

19. The power tool of claim 16, wherein each of the mounting portions includes a plurality of horizontal fins including a top horizontal fin and a bottom horizontal fin that extend toward a respective side of the housing;
wherein the heat sink further includes a plurality of vertical fins extending from a top surface of each of the top horizontal fins.

20. The power tool of claim 19, wherein the plurality of horizontal fins extend perpendicularly to the respective mounting portions;

wherein the plurality of vertical fins extend perpendicularly from the top surface of each of each of the top horizontal fins.

\* \* \* \* \*